United States Patent [19]

Lu

[11] Patent Number: 5,236,027
[45] Date of Patent: Aug. 17, 1993

[54] WHEEL ASSEMBLY

[76] Inventor: Tsai-Chuan Lu, No. 2, Lane 176, Tung-Yi Road, Chia-Yi, Taiwan

[21] Appl. No.: 840,275

[22] Filed: Feb. 24, 1992

[51] Int. Cl.$^5$ .............................................. B60C 7/22
[52] U.S. Cl. ................................... 152/250; 152/270; 152/276; 152/11; 152/5
[58] Field of Search ................... 152/1, 5, 11, 12, 151, 152/246, 247, 251-255, 258, 259, 260, 270, 275, 276, 196, 197, 198, 200, 201, 202, 256, 271, 272; 301/5.1, 64.7

[56] References Cited

U.S. PATENT DOCUMENTS

| | | | |
|---|---|---|---|
| 1,015,113 | 1/1912 | Winter | 152/250 |
| 1,197,987 | 9/1916 | Winick | 152/250 |
| 1,218,548 | 3/1917 | Green | 152/270 |
| 1,354,363 | 9/1920 | Widenhofer | 152/250 |
| 1,399,670 | 12/1921 | Stranahan | 152/250 |
| 1,790,992 | 2/1931 | Matlock | 152/276 |
| 3,568,748 | 3/1971 | Calandro et al. | 152/250 |

*Primary Examiner*—Russell D. Stormer
*Attorney, Agent, or Firm*—Morton J. Rosenberg; David I. Klein

[57] ABSTRACT

The improved wheel assembly includes a hub member having a cylindrical casing with an axial bore adapted to receive the end of a wheel axle, and a plurality of threaded bolts which threadably engage conventional lug nuts; a tubeless, airless tire member having three continuous supporting belts, a plurality of reverse inclined Z-shaped supporting rods connected to each other and to each supporting belt, and a transverse central opening adapted to receive the hub; and an annular cap member adapted to engage the outer periphery of the central opening of the tire member and to receive the bolts of the hub member.

3 Claims, 8 Drawing Sheets

PRIOR ART

FIG.2B

PRIOR ART

FIG.2C

PRIOR ART

WHEEL ASSEMBLY

FIELD OF THE INVENTION

This invention relates to an improved wheel assembly, and more particularly, to a tubeless and airless tire member. The tire member has a plurality of supporting rods connected to a plurality of continuous circular belts to form a metal meshwork. A wire gauze encases the metal meshwork, and an outer layer of an elastic material further encases the wire gauze to define an outer contour of the tire member.

BACKGROUND OF THE INVENTION

Figure 1:
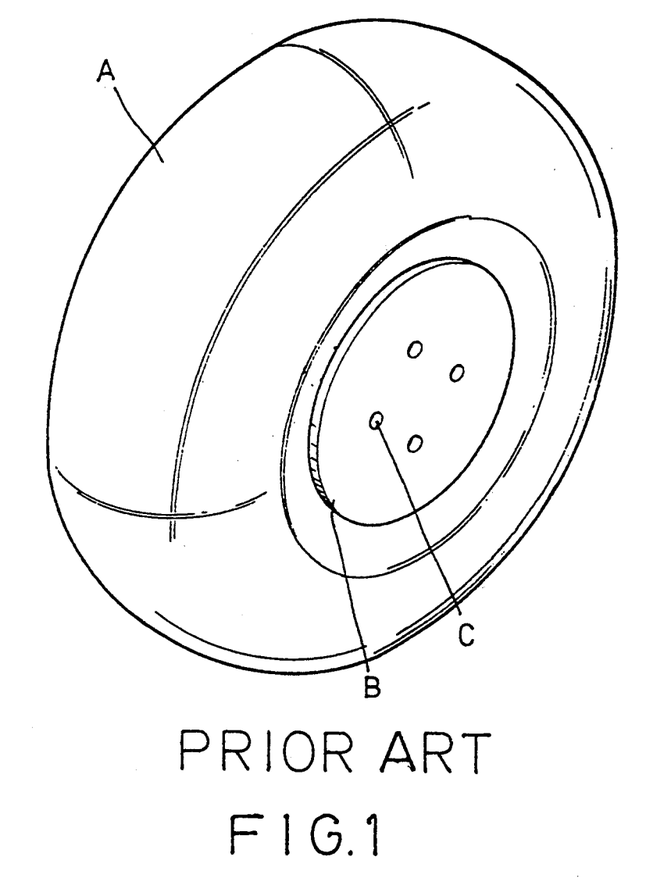
FIG. 1 is a perspective view of a prior art tire.
Figure 2A:
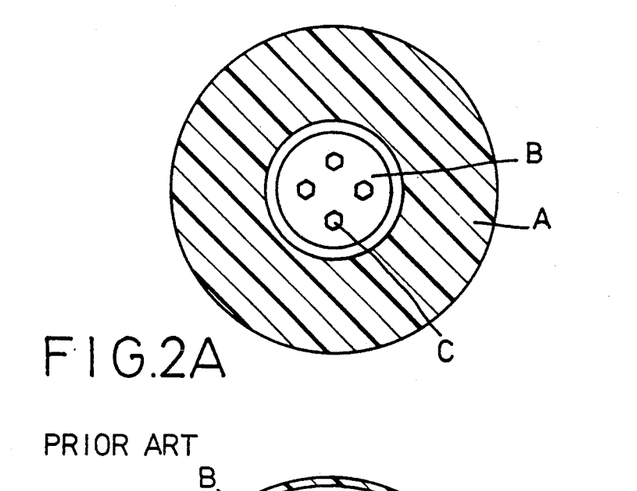
FIGS. 2A-2C are elevational views of prior art tires in cross-section.
Figure 2B:
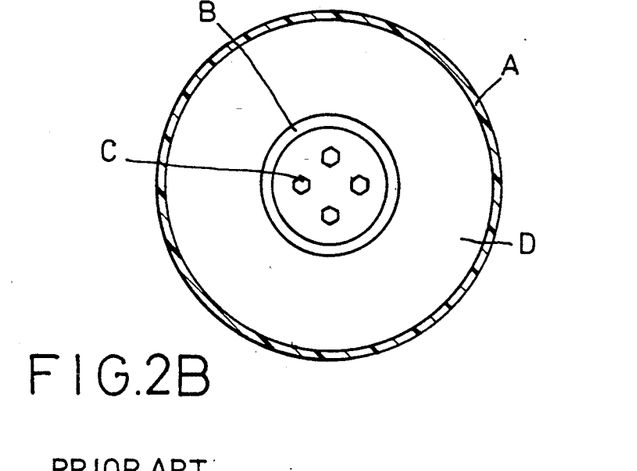
Figure 2C:
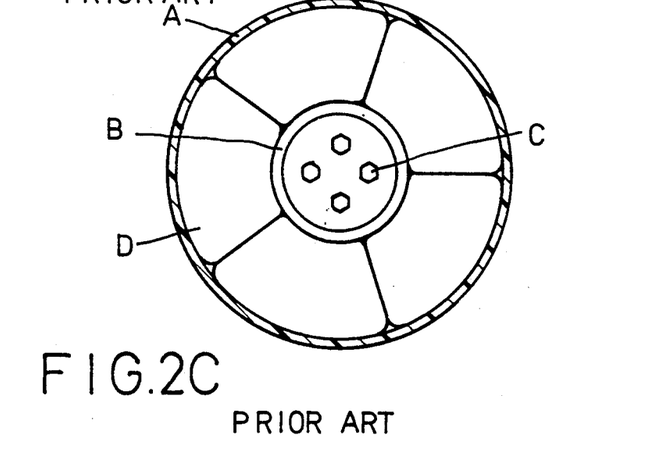

Prior art tires are categorized into a plurality of classes including tubeless, solid tires, tires having one inner tube, and tires having a plurality of inner tubes. All the prior art tires A may be secured to a hub B, which have a plurality of openings C for receiving the bolts of a wheel axle, as shown in FIG. 1. A tubeless, solid tire A as shown in FIG. 2A, comprises a solid body formed of an elastomeric material. The tubeless, solid tire is generally heavy because of the thickness of the solid body and does not have advantageous elastic properties. The poor elastic properties of the tubeless, solid tire results in a harder ride than a tire having air therein. A tire A having an inner tube D received therein as shown in FIG. 2B, has better elastic properties than a tubeless, solid tire, and generally provides a better and smoother ride than tubeless, solid tire. However, when air escapes from the inner tube, the tire becomes underinflated, which leads to uneven and accelerated wear and poor traction with the road surface. Additionally, a tire having an inner tube therein may be overinflated which causes uneven and accelerated wear. A tire A having a plurality of inner tubes D formed therein, as shown in FIG. 2C, suffers from the same disadvantages as the tire having one inner tube formed therein.

There still remains a need for a tubeless, airless tire that has good elastic properties for providing a smooth ride to the vehicle on which it is mounted.

SUMMARY OF THE INVENTION

It is an object of the present invention to mitigate and/or obviate the above-mentioned drawbacks for prior art tires in the manner set forth in the Description of the Preferred Embodiment.

Referring to an object of the present invention is to provide a wheel assembly having a tire member which requires no air, and therefore, cannot be overinflated or underinflated.

Another object of the present invention is to provide a wheel assembly having a tire member which is strong, light in weight, and has good elastic properties.

Further objects and advantages of the present invention will become apparent as further described with the features and novelty being characterized in the Claims annexed to and forming a part of this invention.

DETAILED DESCRIPTION OF THE PREFERRED EMBODIMENT

Referring to FIGS. 3-6, the wheel assembly of the present invention includes a tubeless and airless tire member 1, a hub member 2, and an annular cap member 3.

Figure 3:
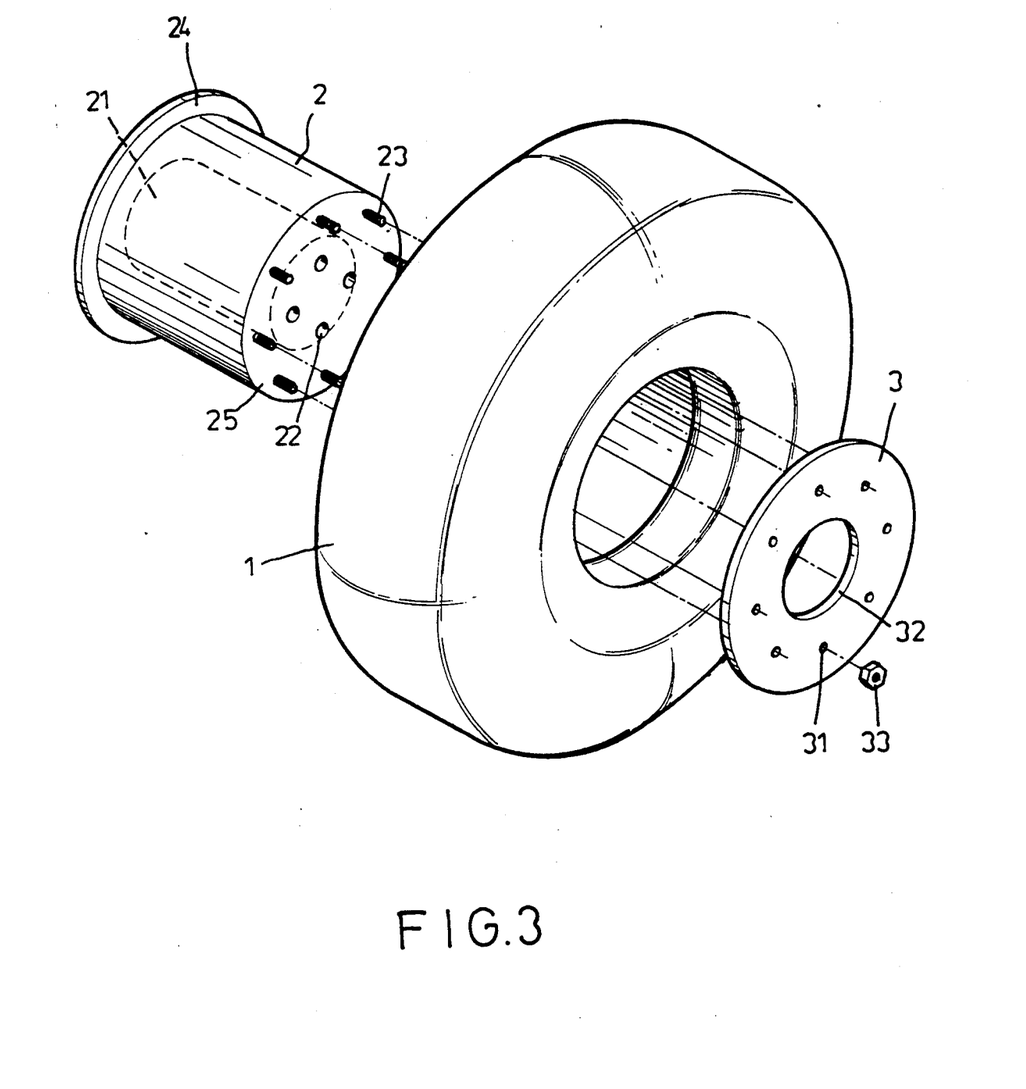
FIG. 3 is a fragmentary exploded view of the present invention.
Figure 4:
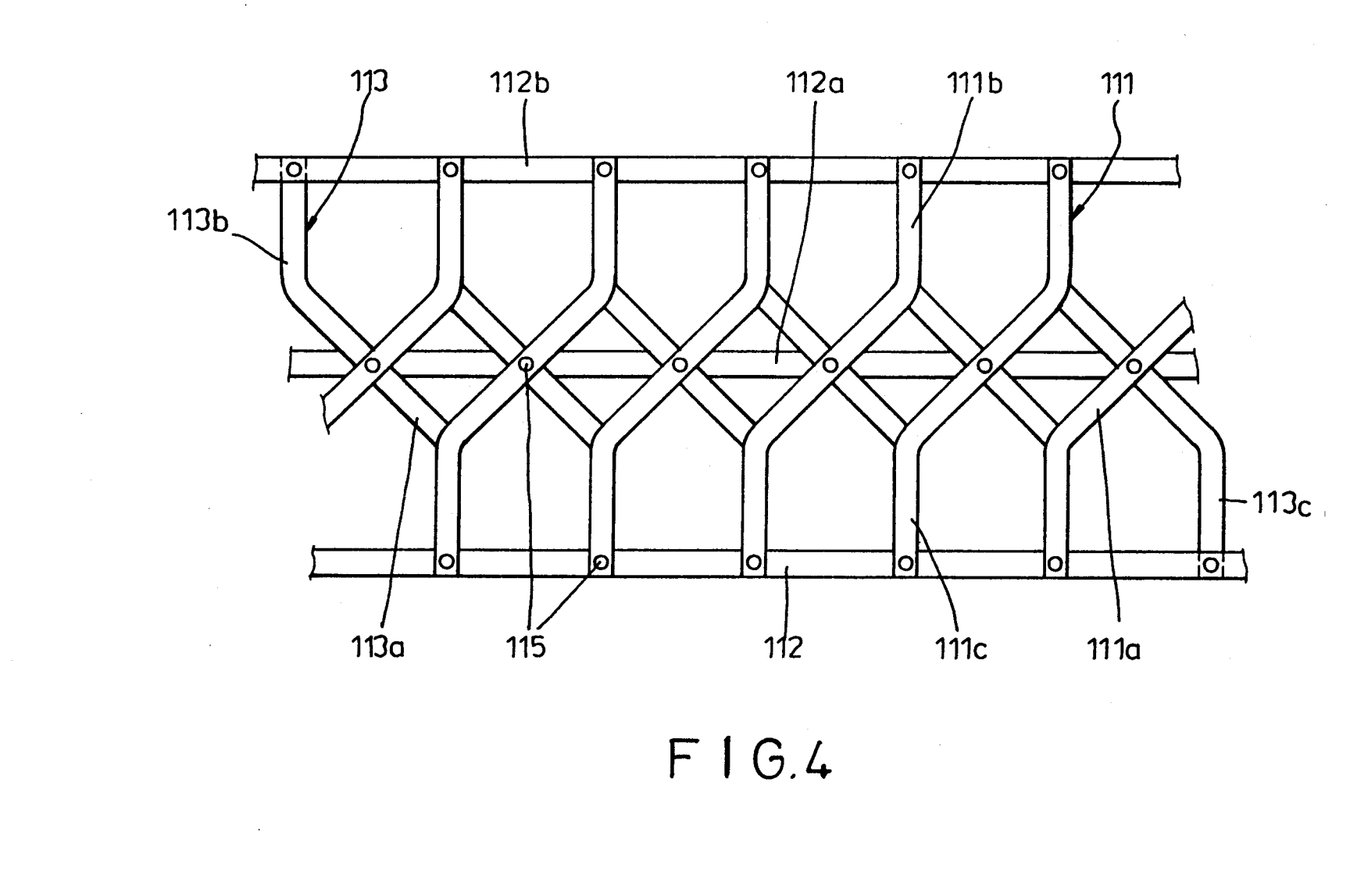
FIG. 4 is an elevational view of the present invention showing a plurality of steel reversing inclined Z-shaped supporting rods secured to three steel belts.
Figure 5A:
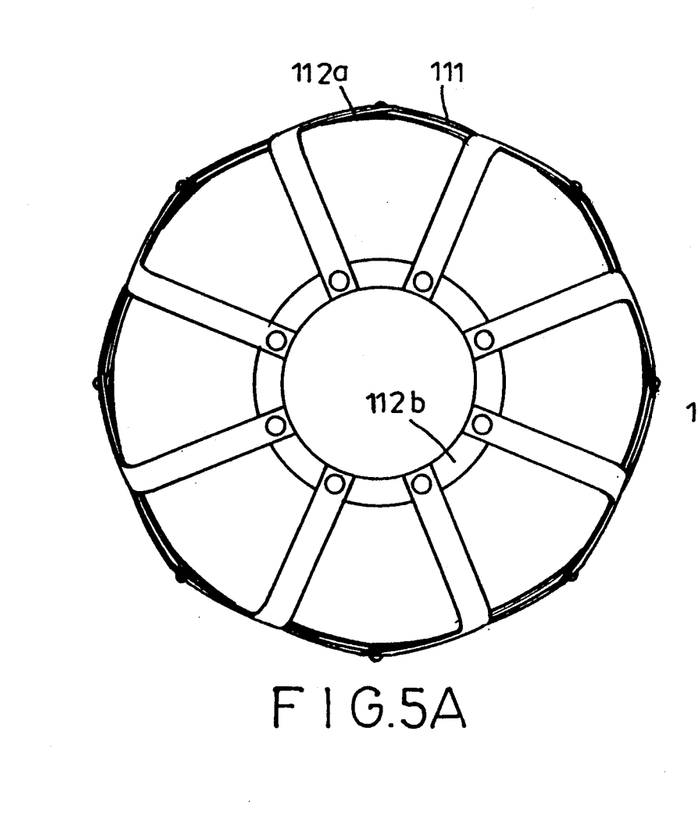
FIG. 5A is a front elevational view of FIG. 4 having respective ends of the three belts connected to form three continuous belts.
Figure 5B:
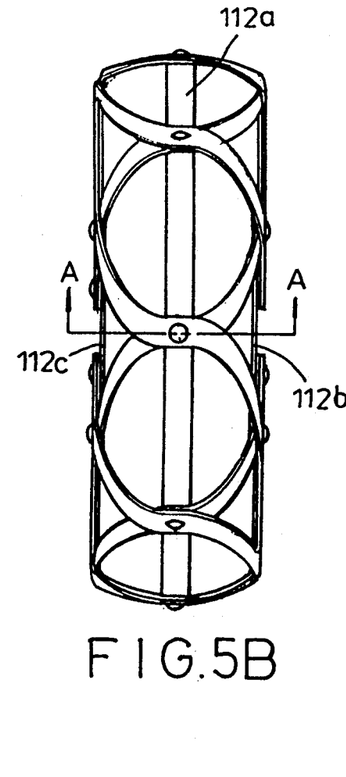
FIG. 5B is a side elevational view of FIG. 5A.
Figure 5C:
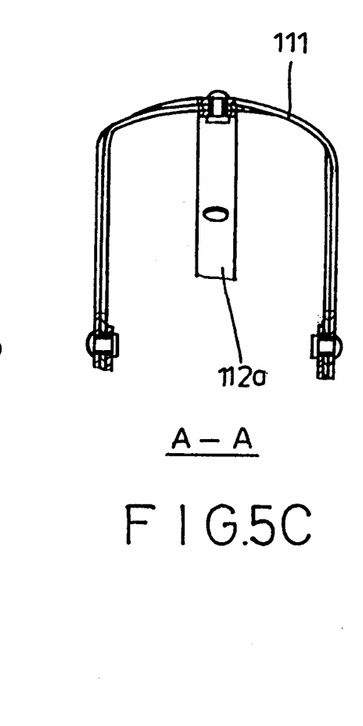
FIG. 5C is an elevational view of FIG. 5B taken along line A—A.
Figure 6:
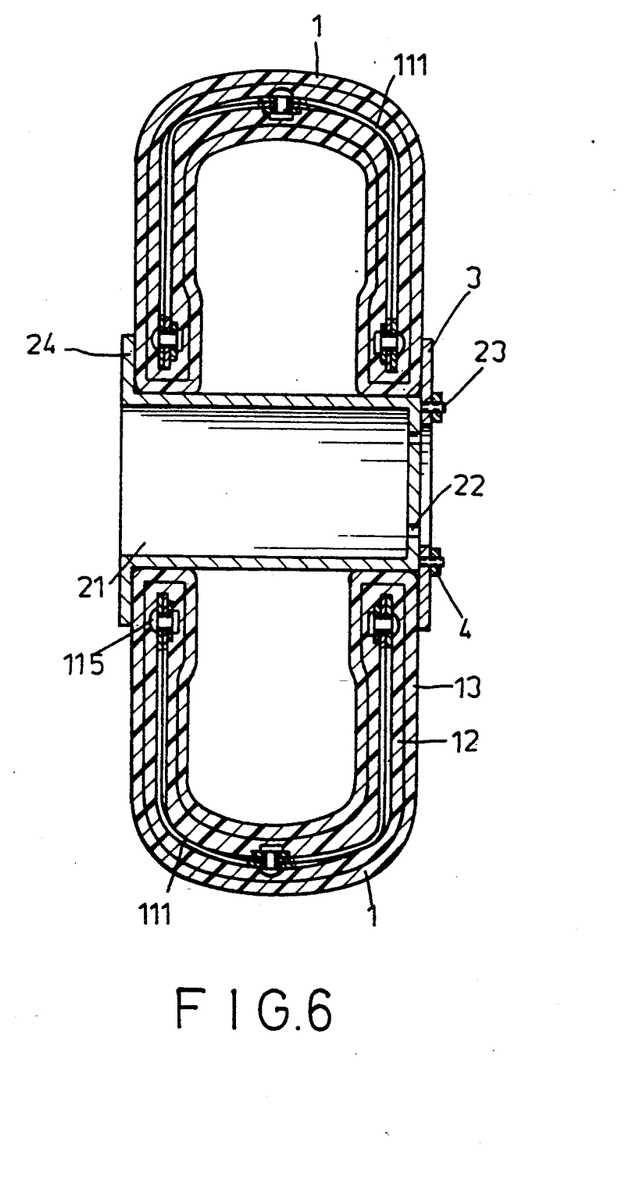
FIG. 6 is a cross-sectional view of the present invention.
Figure 7A:
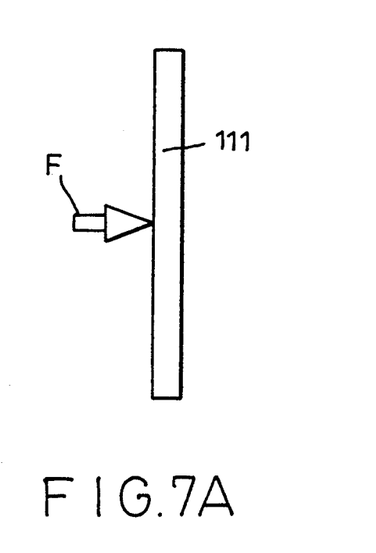
FIGS. 7A and 7B are two elevational views showing a straight steel rod being impacted by a force and the end effect of the force on the rod, respectively.
Figure 7B:
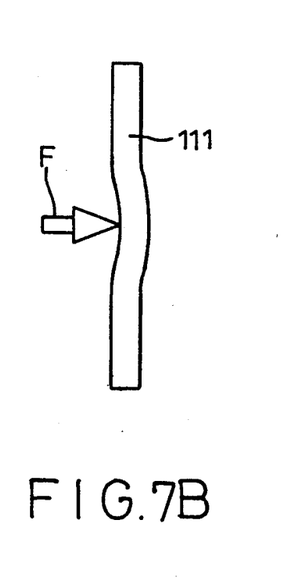
Figure 8A:
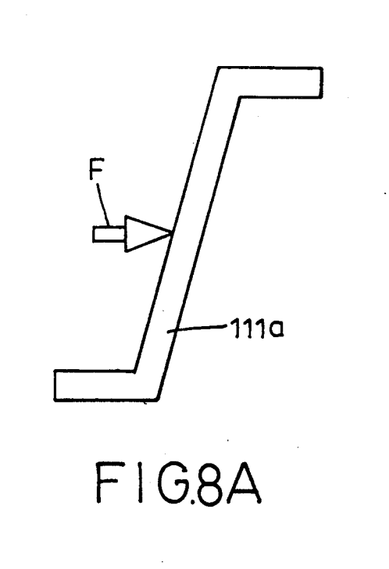
FIGS. 8A and 8B are two elevational views of a reverse inclined Z-shaped supporting rod of the present invention being impacted by a force at its inclined surface, and the effect of the force on the inclined surface, respectively.
Figure 8B:
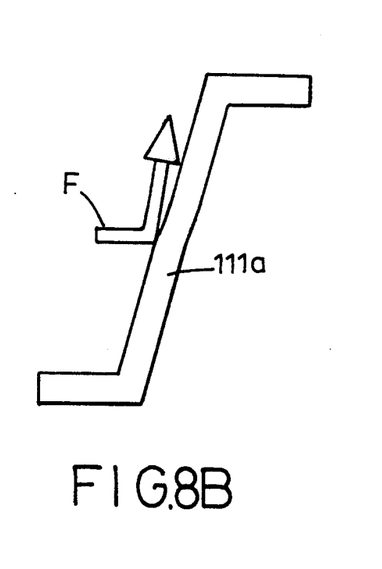
Figure 9A:
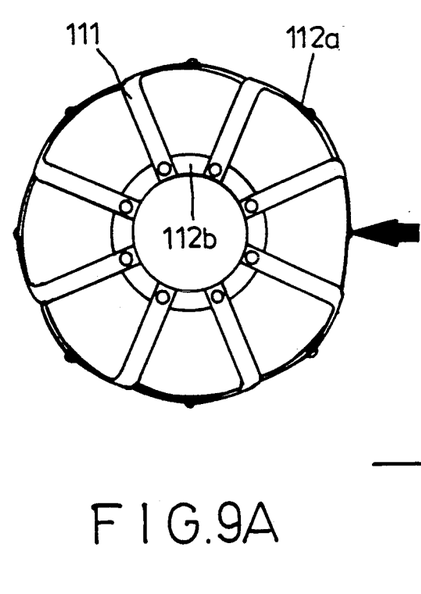
FIGS. 9A and 9B are two front elevational views of FIG. 5A showing the reaction of the steel circular ring formed by the reverse inclined Z-shaped supporting rods and the three continuous belts being impacted by a force.
Figure 9B:
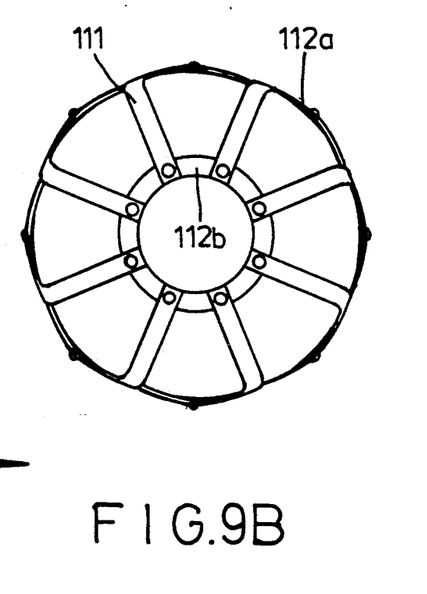

The tire member 1 is comprised of a central belt or band 112A and two outer belts 112B and 112C disposed on opposite sides of the central belt 112A in parallel, spaced relation. A plurality of upper and lower reversed, inclined Z-shaped supporting rods 111 and 113 are respectively secured to and interconnecting the belts 112A, 112B and 112C. The upper and lower reversed inclined Z-shaped supporting rods 111 and 113 are substantially identical.

Supporting rods 111 and 113 each comprise a straight inclined segment 111A or 113A, and first and second leg portions 111B or 113B and 111C or 113C, respectively which are integrally attached to opposing ends of the inclined leg segment 111A or 113A and extend therefrom in opposed parallel directions.

The angles formed between the leg segments 111A or 113A and the respective leg segments 111B or 113B and 111C or 113C are equal with the width of each supporting rod 111 and 113 being greater than its thickness. Upper supporting rods 111 are inclined in one direction on belts 112A, 112B and 112C, and the lower supporting rods 113 are inclined in a cross direction so that a leg segment 111B of a first upper supporting rod 111 overlies and is connected to a leg segment 113B of a first lower supporting rod 113. A leg segment 111C of the first upper supporting rod 111 overlies and is connected to a leg segment 113C of a second lower supporting rod 113, with a central leg segment 111A of the first upper supporting rod 111 intersecting and connected to a central leg segment 113A of a third lower supporting rod 113.

Thus, each upper supporting rod 111 overlies and is connected to portions of three different lower supporting rods 113 to form a strong metal meshwork comprised of a central belt 112A and outer belts 112B and 112C, as well as upper and lower supporting rods 111 and 113, respectively. Upper and lower supporting rods 111 and 113 are connected to each other and to belts 112A, 112B and 112C by rivets 115. Supporting rods 111 and 113 and belts 112A, 112B and 112C are formed of a steel composition.

Upon all upper and lower supporting rods 111 and 113 being secured to each other and belts 112A, 112B, and 112C, the respective ends of belts 112A, 112B and 112C are bent towards and connected to each other to form a circular ring comprising a central continuous belt 112A, with two continuous belts disposed on opposite sides of the central continuous belt.

As shown in FIGS. 5A–5C and 6, the outer belts are bent inwardly to provide the circular ring with a substantially U-shaped cross-section. The circular ring is encased within a wire gauze 12. An outer layer 13 of rubber or like material encases the wire gauze 12 to define the outer contour of the tire member 1.

The hub member 2 comprises a substantially cylindrical casing having an axial bore 21 which is adapted to receive a wheel axle therein. A plurality of circumferentially spaced apertures 22 are formed on the outer end 25 through which bolts of the wheel axle may extend when mounting the wheel assembly on a vehicle. A plurality of circumferentially spaced, integral threaded projections 23 are concentric with apertures 22 and extend outwardly and substantially perpendicularly from outer end 25 with a flange 25 extending outwardly from the inner end of the casing.

The annular cap member as shown in FIG. 3 has an outer diameter equal to the outer diameter of the flange 24 of the casing and is comprised of a substantially circular planar member having a plurality of circumferentially spaced apertures 31 formed therethrough. Each of apertures 31 correspond with and receives a projection 23 of the frame 2. A central opening 32 is adapted for receiving the bolts of a wheel axle therethrough. The projections 23 extend through apertures 31 and are fastened on the outer end of the annular cap member 3 by lug nuts 33.

Referring to FIGS. 4, and 7-9, the advantages of the present invention are shown. The reversed, inclined Z-shaped supporting rods 111 and 113 are capable of sustaining greater impact forces than that of a rod having a straight body member. As shown in FIGS. 7A and 7B, a force, represented by arrow F, impacting a rod having a straight body member is completely absorbed by the body member at the point of impact, thereby resulting in permanent deformation of the straight body member. As shown in FIGS. 8A and 8B, the inclined leg segment 111A of the rod member 111 absorbs only a portion of a similar impacting force F at the point of impact, thereby, allowing the inclined leg segment 111A to return to its original shape, as shown in FIGS. 9A and 9B, where the force F disappears.

As various possible embodiments might be made of the above invention without departing from the scope of the invention, it is to be understood that all matter herein described or shown in the accompanying Drawings is to be interpreted as illustrative and not in a limiting sense. Thus, it will be appreciated that the Drawings are exemplary of a preferred embodiment of the invention.

I claim:
1. An improved wheel assembly:
   a tubeless and airless tire member having a central continuous circular belt and two outer continuous circular belts substantially equidistantly spaced from said central continuous circular belt, a plurality of upper and lower reverse inclined Z-shaped supporting rods connected to each continuous circular belt to form a supporting mesh network, a wire gauze enclosing said supporting mesh network, an elastic outer layer enclosing said wire gauze to define a contour of said tire member, and a transverse axial opening extending through said tire member;
   a hub member having a cylindrical casing adapted to be received by said transverse opening of said tire member, said cylindrical casing having an axial bore, a plurality of circumferentially spaced projections extending outwardly from an outer end of said casing, and a plurality of circumferentially spaced apertures formed in said outer end of said casing and concentric with said projections for receiving bolts of a wheel axle; and,
   an annular cap member having a plurality of circumferentially spaced apertures adapted to receive respective projections of said hub member, and a central opening through which said bolts of said wheel axle extend.

2. An improved wheel assembly as recited in claim 1, wherein each upper and lower reverse inclined Z-shaped supporting rod member comprises an inclined leg segment, and first and second leg segments integrally attached to opposed ends of said inclined leg segment, said first and second leg segments extending in opposite and parallel directions.

3. An improved wheel assembly as recited in claim 2, wherein a first leg segment of a first reverse inclined Z-shaped upper supporting rod overlies and is connected to a first leg segment of a first reverse inclined Z-shaped lower supporting rod, a second leg segment of said first reverse inclined Z-shaped upper supporting rod overlies and is connected to a second leg segment of a second reverse inclined Z-shaped lower supporting rod, and an inclined leg segment of said first reverse inclined Z-shaped upper supporting rod intersects and is connected to an inclined leg segment of a third reverse inclined Z-shaped lower supporting rod.

* * * * *